United States Patent [19]

Kohmura

[11] 4,345,019

[45] Aug. 17, 1982

[54] DIFFUSION TRANSFER PROCESS

[75] Inventor: Isao Kohmura, Nagaokakyo, Japan

[73] Assignee: Mitsubishi Paper Mills, Ltd., Tokyo, Japan

[21] Appl. No.: 255,287

[22] Filed: Apr. 17, 1981

[30] Foreign Application Priority Data

Apr. 23, 1980 [JP] Japan .................................. 55-53772
Jun. 5, 1980 [JP] Japan .................................. 55-75961

[51] Int. Cl.³ .............................................. G03C 5/54
[52] U.S. Cl. .................................. 430/234; 430/249; 430/438; 430/517; 430/566
[58] Field of Search .............. 430/234, 249, 218, 220, 430/437, 438, 481, 466, 483, 566, 517

[56] References Cited

U.S. PATENT DOCUMENTS

| 4,186,004 | 1/1980 | Deabriges et al. | 430/218 |
| 4,199,354 | 4/1980 | Hinshaw et al. | 430/517 |
| 4,199,362 | 4/1980 | Yoshida et al. | 430/218 |
| 4,287,291 | 9/1981 | Onodera | 430/218 |

FOREIGN PATENT DOCUMENTS 1093281 3/1980 United Kingdom .

Primary Examiner—Mary F. Downey
Attorney, Agent, or Firm—Cushman, Darby & Cushman

[57] ABSTRACT

Transfer silver images high in maximum density, contrast and sharpness and small in dependency on developing temperatures are obtained by image wise exposing and developing a diffusion transfer light sensitive material which comprises a support having thereon at least a carbon black-containing layer and a silver halide emulsion layer present on said carbon black containing layer, said carbon black-containing layer and/or layer adjacent thereto containing 3-pyrazolidone compound represented by the following general formula:

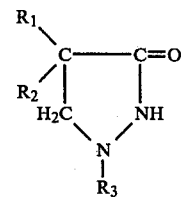

wherein $R_1$ and $R_2$ are hydroxyalkyl or alkyl group of 1–4 carbon atoms, at least one of $R_1$ and $R_2$ being hydroxyalkyl group and $R_3$ is an aryl group.

29 Claims, No Drawings

DIFFUSION TRANSFER PROCESS

BACKGROUND OF THE INVENTION

This invention relates to silver complex diffusion transfer process and especially to photographic materials for use in such process.

The principle of the silver complex diffusion transfer process (DTR process) is disclosed in U.S. Pat. No. 2,352,014.

According to the DTR process a silver complex salt is imagewise transferred by diffusion from a silver halide emulsion layer into an image receiving layer, where it is converted to a silver image usually in the presence of physical development nuclei. For this purpose, a silver halide emulsion layer imagewise exposed is arranged or is brought in contact with an image receiving layer in the presence of a developing agent and a silver halide complexing agent to convert unexposed silver halide to a soluble silver complex salt.

At the exposed area of the silver halide emulsion layer the silver halide is developed (chemical development) and so is no longer dissolved and cannot diffuse.

At the unexposed area of the silver halide emulsion layer the silver halide is converted to a soluble silver complex salt and is transferred into the receiving layer, where it forms a silver image usually in the presence of physical development nuclei (e.g., heavy metals or sulfides thereof).

The actions of silver halides at exposed and unexposed areas are reverse in direct positive silver halide emulsions.

It is well known that rapid formation of transfer silver is necessary for obtaining transfer silver images of high contrast and high sharpness in image receiving layer. The rapid formation of transfer silver is performed by rapid development of transferred silver complex salt, e.g., silver thiosulfate complex salt, due to which said complex salt cannot diffuse in lateral direction in nuclei-containing image receiving layer.

Typical processing solutions used in DTR process contain at least silver halide complexing agents such as thiosulfates, alkaline substances such as sodium hydroxide, preservatives such as sulfites and developing agents such as hydroquinone and 1-phenyl-3-pyrazolidone.

However, these high alkali processing solutions containing the developing agent have the defect that said developing agent undergoes air-oxidation to lose its effect and it is known that this defect can greatly be improved by incorporating the developing agent in DTR materials, namely, in the silver halide emulsion layer and/or hydrophilic colloid layers which are permeable to water through to or out from the silver halide emulsion layer.

In the case of such diffusion transfer materials containing developing agent, alkali activating solutions containing no or substantially no developing agent are generally used.

Japanese Patent Publication (Kokoku) No. 27568/64, No. 30856/72 and No. 43778/76 may be referred to regarding DTR process which uses alkali activating solutions.

According to these patent publications, dihydroxybenzene compounds and 3-pyrazolidone compounds as developing agent are used in an amount of at least 50 mg, preferably 100 mg to 5 g per 1 $m^2$ of light sensitive material.

However, even if the developing agent is incorporated in a silver halide emulsion layer or nonlight sensitive layers such as protective layer, intermediate layer, undercoat layer, etc., the oxidation of the developing agent with air cannot be completely avoided and as a result there occur undesired effects such as reduction of developing speed, decrease of sensitivity, reduction of contrast and density of silver images, occurrence of fog, etc.

The loss of effect of developing agent is caused by not only oxidation with air, but other factors, one of which is carbon black.

It is well known that carbon black is useful as a pigment for preventing halation, but it is also well known that carbon black causes fogging of silver halide photographic materials during storage [see, e.g., Japanese Patent Publication (Kokai) No. 68520/75]. Furthermore, when the photographic materials stored contain carbon black contacting with developing agents such as 1-phenyl-3-pyrazolidone, the greater fog occurs to result in reduction of density and gradient of silver on image receiving elements which is obtained by diffusion transfer development and decrease of transfer speed.

The occurrence of much fog brought about by coexistence of carbon black and 1-phenyl-3-pyrazolidone is due to promotion of the defect of either one of the two, but it is not known which defect is promoted.

Another disadvantage of incorporation of developing agent in DTR materials is due to the large amount of developing agent incorporated. That is, the amount of developing agent usually contained in DTR materials is about 5 times (per one unit of silver halide) that of the developing agent usually contained in DTR processing solutions. This fact indicates necessity to consider any inefficient utilization of developing agent, limitation in content of developing agent, unfavourable effect of excess developing agent, etc.

However, use of developing agent, especially, 3-pyrazolidone in an amount of less than about 50 mg/$m^2$ in combination with inefficient utilization thereof increases dependence on processing temperature of DTR processing solution and, for example, there is the defect that contrast decreases by processing at low temperatures such as 10°–15° C. This decrease of contrast sometimes causes formation of yellowish brown silver images in image receiving layers even with use of blackening agents such as 1-phenyl-5-mercaptotetrazole.

SUMMARY OF THE INVENTION

Accordingly, it is an object of this invention to provide a silver complex diffusion transfer process which can produce transfer silver images with high maximum density, contrast and sharpness.

Another object of this invention is to provide a silver complex diffusion transfer process which can produce purely black transfer silver images with small dependence on developing temperatures and high maximum density, contrast and sharpness.

Still another object of this invention is to provide a diffusion transfer materials suitable for being processed with alkali activating solutions containing substantially no developing agent.

DESCRIPTION OF THE INVENTION

These objects are achieved according to this invention by developing silver complex diffusion transfer materials comprising a support having thereon at least a carbon black containing layer wherein said carbon black containing layer and/or a layer contiguous thereto contain 3-pyrazolidone compounds represented by the following general formula:

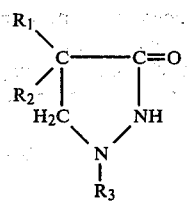

wherein $R_1$ and $R_2$ are hydroxyalkyl or alkyl group of 1-4 carbon atoms which may be substituted, at least one of $R_1$ and $R_2$ being hydroxyalkyl group and $R_3$ is an aryl group which may be substituted. The substituents of the aryl group are, for example, lower alkyl group, halogen atoms, amino group, lower alkylamino group, acetylamino group, lower alkoxy group, etc.

Examples of the compounds are as follows:
Compound 1: 4,4-dihydroxymethyl-1-phenyl-3-pyrazolidone
Compound 2: 4,4-dihydroxymethyl-1-tolyl-3-pyrazolidone
Compound 3: 4-hydroxymethyl-4-methyl-1-phenyl-3-pyrazolidone
Compound 4: 4-hydroxymethyl-4-methyl-1-(p-chlorophenyl)-3-pyrazolidone According to one embodiment of this invention, there is provided a negative material for silver complex diffusion transfer process which comprises a support having thereon an antihalation layer containing carbon black, 3-pyrazolidone having said general formula and hydroquinone and a silver halide emulsion layer on said antihalation layer.

The 3-pyrazolidone compound of said general formula is preferably used in combination with a dihydroxybenzene developing agent.

Examples of the dihydroxybenzene compounds are hydroquinone, chlorohydroquinone, bromohydroquinone, isopropylhydroquinone, methylhydroquinone, 2,3-dichlorohydroquinone, 2,5-dimethylhydroquinone, 2,3-dibromohydroquinone, 1,4-dihydroxy-2-acetophenone-2,5-dimethylhydroquinone, catecohol, 4-phenethylcatecohol, 4-phenopropylcatecohol, 4-phenopropylcatecohol, 4-t-butylcatecohol, 4,5-dibromocatecohol, 2,5-diethylhydroquinone, 2,5-di-p-phenethylhydroquinone, 2,5-dibenzoyl-aminohydroquinone, 2,5-diphenyl-3,6-di-benzylhydroquinone, 2,5-acetaminohydroquinone, etc.

Other pyrazolidones than those of the above general formula may also be used, if necessary, in combination with those of the general formula and it will be explained hereinafter that such combination use is preferred. Examples of these pyrazolidones are, as 3-pyrazolidone compounds, 1-phenyl-3-pyrazolidone, 1-p-tolyl-3-pyrazolidone, 1-phenyl-4-methyl-3-pyrazolidone, 1-phenyl-4,4-dimethyl-3-pyrazolidone, 1-p-chlorophenyl-3-pyrazolidone, 1-p-methoxyphenyl-3pyrazolidone, 1-phenyl-2-acetyl-3-pyrazolidone, 1-phenyl-5,5-dimethyl-3-pyrazolidone, 1-o-chlorophenyl-4-methyl-4-ethyl-3-pyrazolidone, 1-m-acetamidophenyl-4, 4-diethyl-3-pyrazolidone, 1,5-diphenyl-3-pyrazolidone, 1-(m-tolyl)-5-phenyl-3-pyrazolidone, etc.

The 3-pyrazolidones of the above general formula may be used in an amount of 0.01–1 g/m$^2$ and the dihydroxybenzene developing agent may be used in an amount of about 0.3–5 g/m$^2$ and they are preferably contained in the same layer, but they may be contained in separate layers.

The 3-pyrazolidones of the above general formula are contained in a carbon black containing layer and/or a layer contiguous thereto, e.g., a silver halide emulsion layer.

The amount of silver in a silver halide emulsion layer is generally 0.5–3.5 g/m$^2$ in terms of silver nitrate.

Use of 0.3–0.8 g of the dihydroxybenzenes and 0.05–0.25 g of the 3-pyrazolidones of the above general formula in combination per 1 g of silver halide in terms of silver nitrate is especially preferred.

The best result can be obtained when pH of the antihalation layer containing carbon black is 4.5 or less. Preferably pH of silver halide emulsion layer is also 5.0 or less.

Carbon black may be used within the range of about 0.01–2.0 g/m$^2$, but may be used in an amount outside this range.

The carbon black may be used at the state dispersed with various surfactants. The surfactants are preferably those which have no adverse photographic effects and any of those which are known to be used in coating solutions for photographic layers. Examples of such surfactants are anionic surfactants such as higher alcohol sulfates, higher alkylarylsulfonates, higher alkylnaphthalenesulfonates, higher alkyl phosphates, dialkylsulfosuccinates, etc.

It has been found that one improved embodiment of this invention comprises processing with alkali activating solutions a negative material wherein silver halide emulsion layer and/or hydrophilic colloid layer which is permeable to water through to or out from the silver halide emulsion layer provided on a support contain at least one dihydroxybenzene compound and at least two 1-phenyl-3-pyrazolidone compounds which are combination of 4-substituted-3-pyrazolidone compounds of the above general formula and 3-pyrazolidone compounds having no substituent at 4-position. According to one preferred embodiment of this invention, there are provided diffusion transfer materials in which amount of the dihydroxybenzene is 0.3–3.0 g/m$^2$ and total amount of the 3-pyrazolidones is at least 0.1 g/m$^2$ and amount of 1-phenyl-4-unsubstituted-3-pyrazolidone is less than ⅓ of the weight of 1-phenyl-4-substituted-3-pyrazolidone.

Examples of 4-unsubstituted-3-pyrazolidones are as follows:
Compound (a) 1-phenyl-3-pyrazolidone
Compound (b) 1-(m-tolyl)-3-pyrazolidone
Compound (c) 1-phenyl-2-acetyl-3-pyrazolidone According to a preferred embodiment of this invention, there are provided diffusion transfer materials comprising a support having thereon an antihalation layer containing carbon black and a silver halide emulsion layer on said antihalation layer wherein said antihalation layer contains 0.3–3.0 g/m$^2$ of dihydroxybenzene compound such as hydroquinone and 0.08–0.8 g/m$^2$ of 1-phenyl-4-hydroxyalkyl substituted-3-pyrazolidone and 0.005–0.05 g/m$^2$ of 1-phenyl-3-pyrazolidone which is less than ⅓ of the weight of said 1-phenyl-4-hydroxyalkyl substituted-3-pyrazolidone.

It is preferred for obtaining transfer images of high contrast and sharpness that the amount of gelatin binder in silver halide emulsion layer is as small as possible, but in the case of using the gelatin binder, for example, in an amount of 0.4–1.0 parts by weight, incorporation of a large amount of developing agent is liable to result in various disadvantages (e.g., aggregation) as previously mentioned. Therefore, preferably a substantially effective amount of developing agent is contained in a layer containing a relatively a large amount of binder such as an antihalation layer.

The supports may comprise any of the various types which are usually employed, for example, polyolefin films such as polyethylene, polypropylene, polystyrene, etc., cellulose ester films such as cellulose acetate, cellulose nitrate, etc., polyester films such as polyethylene terephthalate, papers, synthetic papers, composites thereof such as papers or films both or one side of which are coated with polyolefins, etc.

It is known to provide, if necessary, back side layers on the supports for antihalation, anti-curling, antistatic, anti-slip purposes. Therefore, the back side of the photographic materials of this invention may have layers for these purposes which contain dyes, pigments, etc. for antihalation, antistatic agents, matting agents for anti-slip.

The pH of the back layers is 5 or less, preferably 4.5 or less.

The silver halide emulsions used in this invention may be silver chloride, silver bromide, silver chlorobromide and these silver halides additionally containing iodides. These silver halides may have any crystal habits, grain size and grain distribution and can be prepared by any of the well-known procedures.

The emulsions may be chemically sensitized with various sensitizers, for example, sulfur sensitizers (such as hypo, thiourea, gelatins containing unstable sulfur, etc.), noble metal sensitizers (such as gold chloride, gold rhodanate, ammonium chloroplatinate, silver nitrate, silver chloride, palladium salts, rhodium salts, iridium salts, etc.), polyalkylenepolyamine compounds disclosed in U.S. Pat. No. 2,518,698, etc., imino-aminomethane-sulfonic acid disclosed in German Pat. No. 1,020,864, reducing sensitizers (such as stannous chloride, etc.), etc.

Hydrophilic binders advantageously used for preparation of light sensitive emulsions of the silver halide photographic light sensitive materials of this invention include lime-treated gelatin, acid-treated gelatin, gelatin derivatives (for example, those mentioned in Japanese Patent Publications (Kokoku) No. 4854/63, No. 5514/64, No. 12237/65 and No. 26845/67, U.S. Pat. Nos. 2,525,753, 2,594,293, 2,614,928, 1,763,639, 3,118,766, 3,132,945, 3,186,846 and 3,312,553 and British Pat. Nos. 861,414 and 1,033,189, etc.), proteins such as albumin, casein, etc., cellulose compounds such as carboxymethylcellulose, hydroxyethylcellulose, etc., natural polymers such as agar, sodium alginate, etc., synthetic hydrophilic binders such as polyvinyl alcohol, poly-N-vinylpyrrolidone, polyacrylic acid copolymers, polyacrylamide, their derivatives or partial hydrolyzates. These hydrophilic binders may be used singly or in combination. Furthermore, these hydrophilic binders may also be advantageously used for preparing non-light sensitive layers such as antihalation layers containing carbon black, intermediate layers, protective layers (or peeling layers), image receiving layers, back layers, etc.

It is desired that the amount of the binder for silver halide emulsion layers is at most 2 parts by weight, preferably up to 1.5 part by weight per silver halide in terms of silver nitrate and more preferred results are obtained when the amount of the binder in the carbon black layer provided between silver halide emulsion layer and a support is more than the amount of the binder for said emulsion layer, preferably at least 2 parts by weight.

The silver halide emulsions may also be spectrally sensitized for blue, green and red. The sensitizing dyes can be cyanine dyes, merocyanine dyes and other sensitizing dyes.

Furthermore, various additives may be incorporated in the constituting elements of the silver halide photographic light sensitive materials of this invention.

The examples of these additives are hardeners such as formalin, mucochloric acid, chrome alum, vinyl sulfone compounds, epoxy compounds, ethyleneimine compounds, etc., antifogging agents or stabilizers such as mercapto compounds, tetrazinedene compounds, surfactants such as saponin, sodium alkylbenzenesulfonic acid, sulfosuccinic acid esters, anionic compounds, e.g., alkylarylsulfonate described in U.S. Pat. No. 2,600,831, amphoteric compounds as mentioned in U.S. Pat. No. 3,133,816, fluorescent brighteners as mentioned in Japanese Patent Publication (Kokoku) No. 7127/59, wetting agent such as wax, glycerides of higher fatty acids, higher alcohol esters, etc., mordants such as N-guanylhydrazone compounds, quaternary onium compounds, tertiary amine compounds, etc., antistatic agents such as diacetylcellulose, styrene-perfluoroalkylene sodium maleate copolymers, alkali salts of reaction products of styrene-maleic anhydride copolymer and p-aminobenzenesulfonic acid, etc., matting agents such as polymethacrylic acid esters, polystyrene, colloidal silicon oxide, etc., film property modifiers such as acrylic acid esters, various latexes, etc., gelatin plasticizers such as glycerin, those as mentioned in Japanese Patent Publication (Kokoku) No. 4939/68, viscosity increasing agents such as styrene-maleic acid copolymer, those as mentioned in Japanese Patent Publication (Kokoku) No. 21574/61, antioxidants, pH regulators, etc.

The back layers may additionally contain the developing substances as previously mentioned.

The processing solutions used for diffusion transfer process may contain alkaline substances such as sodium hydroxide, potassium hydroxide, lithium hydroxide, trisodium phosphate, etc., silver halide solvents such as sodium thiosulfate, ammonium thiocyanate, cyclic imide compounds, thiosalicyclic acid, etc. preservatives such as sodium sulfite, etc., thickening agents such as hydroxyethylcellulose, carboxymethyl cellulose, etc., antifogging agents such as potassium bromide, 1-phenyl-5-mercaptotetrazole, etc., if necessary, developing agents such as hydroquinone, 1-phenyl-3-pyrazolidone, etc., development modifiers such as polyoxyalkylene compounds, onium compounds, alkanolamines, etc.

The following examples are included for further illustration of this invention, but are never intended to limit the invention.

EXAMPLE 1

On one surface of a both surfaces polyethylene coated paper support of 110 g/m$^2$ was provided a undercoat layer of 3 g/m$^2$ of gelatine containing carbon black for antihalation and 1 g/m$^2$ of hydroquinone and 0.3 g/m$^2$ of 3-pyrazolidone. On this undercoat layer was provided an orthochromatically sensitized gelatino-silver halide emulsion layer (gelatin 1 g/m$^2$) containing silver chloride of 0.3μ in average particle diameter in an amount of 1.5 g/m$^2$ in terms of silver nitrate and further containing 0.2 g/m$^2$ of hydroquinone.

The undercoat layer and the emulsion layer were adjusted to have a pH of 4.1 and hardened with formalin.

A gelatin layer of 4 g/m² having a pH of 4.5 was provided on the back side of the support.

According to the method explained above, negative materials were produced. Amount of carbon black and kind of 3-pyrazolidones used are as shown in the following Table.

| Sample No. | Carbon black (g/m²) | 3-pyrazolidones |
|---|---|---|
| 1 | 0.2 | 1-phenyl-3-pyrazolidone |
| 2 | 0.6 | |
| 3 | 0.2 | 1-phenyl-4-methyl-3-pyrazolidone |
| 4 | 0.6 | |
| 5 | 0.2 | 1-phenyl-4,4-dimethyl-3-pyrazolidone |
| 6 | 0.6 | |
| 7 | 0.2 | Compound 3 exemplified hereinbefore |
| 8 | 0.6 | |

These samples were cut and enclosed in a black laminated bag, which was stored for 5 days at 50° C. 80% RH.

The samples immediately after production and after storage were sensitometrically exposed. Thereafter, they were brought in contact with positive materials and passed through an ordinary developing device having the following diffusion transfer processing solution. After lapse of 60 seconds, they were separated from each other. (Processing temperature was 20° C.).

| Water | 800 ml |
|---|---|
| Anhydrous sodium sulfite | 40 g |
| Trisodium phosphate (12 H₂O) | 75 g |
| Potassium hydroxide | 5 g |
| Sodium thiosulfate (5 H₂O) | 20 g |
| Potassium bromide | 1 g |
| 1-phenyl-5-mercaptotetrazole | 0.1 g |
| Water to make 1 l | |

Density and relative sensitivity of silver images on the positive materials obtained with the eight kinds of negative materials are shown in Table 1. When the negative materials immediately after production were used, the reflective densities of silver images were all 1.33±0.1 and relative sensitivites were the same. Therefore, only the results obtained with negative materials after storage are shown. The relative sensitivity is a relative value when sensitivity immediately after production is taken as 100.

TABLE 1

| Negative material No. | Reflective density | Relative sensitivity |
|---|---|---|
| 1 | 1.12 | 75 |
| 2 | 1.00 | 69 |
| 3 | 1.15 | 77 |
| 4 | 1.03 | 73 |
| 5 | 1.19 | 80 |
| 6 | 1.09 | 74 |
| 7 | 1.30 | 96 |
| 8 | 1.29 | 95 |

Table 1 shows increase in the amount of carbon black resulted in much decrease in reflective density and relative sensitivity due to storage of the negative materials.

From this fact, fog of negative materials is considered to have increased and it is considered that especially with loss of effect of 3-pyrazolidones the relative sensitivity also decreased.

It is recognized that 3-pyrazolidones of samples No. 7 and 8 were hardly influenced by carbon black and these are superior in shelf stability.

Moreover, the positive images obtained from samples No. 7 and 8 had high contrast and sharpness.

EXAMPLE 2

Negative materials were produced in the same manner as in Example 1 except that 3-pyrazolidones used in the undercoat layer in Example 1 were incorporated in silver halide emulsion layer.

Substantially the same results as in Example 1 were obtained using these negative materials which were stored for 3 days at 50° C. 80% RH.

EXAMPLE 3

On one surface of a both surface polyethylene coated paper support of 110 g/m² was provided an undercoat layer of 3 g/m² of gelatin containing 0.3 g/m² of carbon black for antihalation and 1 g/m² of hydroquinone. On this undercoat layer was provided an orthochromatically sensitized gelatino-silver halide emulsion layer (gelatin 1 g/m²) containing silver chloride of 0.3µ in average particle diameter in an amount of 1.5 g/m² in terms of silver nitrate and further containing 0.2 g/m² of hydroquinone, etc.

Both the undercoat and emulsion layers were adjusted to have a pH of 4.1 and hardened with formalin.

A gelatin layer of 4 g/m² having a pH of 4.5 was provided on back surface of the support. (Sample No. 1).

Samples No. 2–9 were produced in the same manner as of production of above Sample No. 1 except that 1-phenyl-3-pyrazolidones as shown in the following table were contained in the undercoat layer.

| Sample No. | 1-phenyl-3-pyrazolidone | Content (mg/m²) |
|---|---|---|
| 1 | — | — |
| 2 | Compound 3 | 30 |
| 3 | Compound 2 | 30 |
| 4 | Compound a | 30 |
| 5 | Compound 3 | 200 |
| 6 | Compound 2 | 200 |
| 7 | Compound a | 200 |
| 8 | Compound 3 | 200 |
|   | Compound a | 30 |
| 9 | Compound 2 | 200 |
|   | Compound a | 30 |

These samples were sensitiometrically exposed and thereafter brought in contact with positive materials. These were passed through an ordinary developing device having the following diffusion transfer processing solution (10° C.) and after lapse of 60 seconds they were separated from each other.

| Water | 800 ml |
|---|---|
| Anhydrous sodium sulfite | 40 g |
| Trisodium phosphate (12 H₂O) | 75 g |
| Potassium hydroxide | 5 g |
| Sodium thiosulfate (5 H₂O) | 20 g |
| Potassium bromide | 1 g |
| 1-phenyl-5-mercaptotetrazole | 0.1 g |

-continued

| Water to make | 1 l |
| --- | --- |

The silver images obtained in Sample No. 1–7 processed at a low temperature of 10° C. had lower contrast, yellowish brown color or lower maximum density.

On the other hand, in Samples No. 8 and 9 there were obtained black silver images extremely high in contrast, very small in change of the contrast and very high in sharpness even after processing at a low temperature of 10° C.

What is claimed is:

1. A silver complex diffusion transfer process which comprises imagewise exposing a light sensitive material which comprises a support having thereon at least a carbon black-containing hydrophilic colloid layer and a silver halide emulsion layer contiguous thereto and thereabove, said carbon black-containing layer and/or said silver halide emulsion layer containing a 3-pyrazolidone compound and said silver halide emulsion layer and/or a hydrophilic colloid layer which is permeable to water through or out from the silver halide emulsion layer containing a dihydroxybenzene developing agent, then silver complex diffusion transfer developing thus exposed light sensitive material in contact with an image-receiving material with a processing solution containing at least an alkali agent, a preservative and a silver halide solvent and containing substantially no silver halide developing agent and thereafter separating these materials from each other to form a silver image on the image receiving material, the 3-pyrazolidone compound having the general formula:

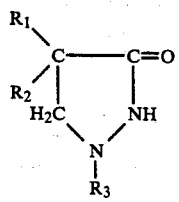

wherein $R_1$ and $R_2$ are a hydroxyalkyl or an alkyl group of 1–4 carbon atoms, at least one of $R_1$ and $R_2$ being a hydroxyalkyl group and $R_3$ is an aryl group.

2. A silver complex diffusion transfer process according to claim 1 wherein the dihydroxybenzene developing agent is 1,4-dihydroxybenzene.

3. A silver complex diffusion transfer process according to claim 1 wherein the amount of 3-pyrazolidone of the general formula is 0.01–1 g/m² and that of dihydroxybenzene is 0.3–5 g/m².

4. A silver complex diffusion transfer process according to claim 1 wherein the 3-pyrazolidone of the general formula and dihydroxybenzene are both contained in the carbon black layer.

5. A silver complex diffusion transfer process according to claim 1 wherein the carbon black layer containing 3-pyrazolidone of the general formula has a pH of 4.5 or less.

6. A silver complex diffusion transfer process according to claim 4 wherein the carbon black layer containing 3-pyrazolidone of the general formula has a pH of 4.5 or less.

7. A silver complex diffusion transfer process according to claim 1 wherein the carbon black layer has a pH of 4.5 or less and the silver halide emulsion layer has a pH of 5.0 or less.

8. A silver complex diffusion transfer process according to claim 1 wherein the alkali agent, the preservative and the silver halide solvent are a tertiary phosphate, a sulfite and a thiosulfate, respectively.

9. A silver complex diffusion transfer process which comprises imagewise exposing a light sensitive material which comprises a support having thereon at least a carbon black-containing hydrophilic colloid layer and a silver halide emulsion layer contiguous thereto and thereabove, said carbon black-containing layer and/or said silver halide emulsion layer containing a 3-pyrazolidone compound, then silver complex diffusion transfer developing thus exposed light sensitive material in contact with an image-receiving material and thereafter separating these materials from each other to form a silver image on the image receiving material, the 3-pyrazolidone compound having the general formula:

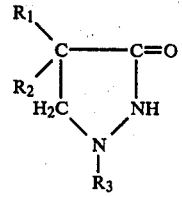

wherein $R_1$ and $R_2$ are a hydroxyalkyl or an alkyl group of 1–4 carbon atoms, at least one of $R_1$ and $R_2$ being a hydroxyalkyl group and $R_3$ is an aryl group.

10. A silver complex diffusion transfer process according to claim 9 wherein the carbon black layer has a pH of 4.5 or less.

11. A silver complex diffusion transfer process according to claim 10 wherein the silver halide emulsion layer has a pH of 5.0 or less.

12. A silver complex diffusion transfer process according to claim 9 wherein the exposed light sensitive material is developed with a processing solution containing an alkali agent, a preservative and a silver halide solvent.

13. A silver complex diffusion transfer process according to claim 12 wherein the processing solutions contains substantially no developing agent.

14. A silver complex diffusion transfer process according to claim 12 wherein the alkali agent, the preservative and the silver halide solvent are a tertiary phosphate, a sulfite and a thiosulfate, respectively.

15. A silver complex diffusion transfer material which consists of an opaque support which may have a back layer, a carbon black-containing antihalation layer provided on said support and a silver halide emulsion layer contiguous to and above said antihalation layer and, if necessary, a hydrophilic colloid protective layer on said silver halide emulsion layer, said antihalation layer and/or said silver halide emulsion layer containing a 3-pyrazolidone compound and at least one of said layers containing dihydroxybenzene developing agent, the 3-pyrazolidone having the general formula:

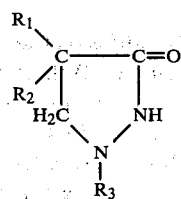

wherein $R_1$ and $R_2$ are a hydroxyalkyl or an alkyl group of 1–4 carbon atoms, at least one of $R_1$ and $R_2$ being a hydroxyalkyl group and $R_3$ is an aryl group.

16. A silver complex diffusion transfer material according to claim 15 wherein at least the carbon black layer contains both the 3-pyrazolidone compound of the general formula and the dihydroxybenzene developing agent.

17. A silver complex diffusion transfer material according to claim 15 wherein the carbon black layer has a pH of 4.5 or less and the silver halide emulsion layer contains a pH of 5.0 or less.

18. A silver complex diffusion transfer material according to claim 15 wherein at least one of the layers additionally contains a 3-pyrazolidone compound having no substituent at the 4-position.

19. A silver complex diffusion transfer material according to claim 15 wherein the pyrazolidone compound is 4,4-dihydroxymethyl-1-phenyl-3-pyrazolidone.

20. A silver complex diffusion transfer material according to claim 15 wherein the 3-pyrazolidone compound is 4,4-dihydroxymethyl-1-tolyl-3-pyrazolidone.

21. A silver complex diffusion transfer material according to claim 15 wherein the 3-pyrazolidone compound is 4-hydroxymethyl-4-methyl-1-phenyl-3-pyrazolidone.

22. A silver complex diffusion transfer material according to claim 15 wherein the 3-pyrazolidone compound is 4-hydroxymethyl-4-methyl-1-(p-chlorophenyl)-3-pyrazolidone.

23. A silver complex diffusion transfer process which comprises imagewise-exposing a light sensitive material containing at least one dihydroxybenzene compound, at least one 3-pyrazolidone having the following general formula and at least one 3-pyrazolidone having no substituent at 4-position in silver halide emulsion layer and/or hydrophilic colloid layer which is permeable to water through or out from the silver halide emulsion layer which are provided on a support and thereafter silver complex diffusion transfer developing the light sensitive material with an alkaline solution containing substantially no developing agent:

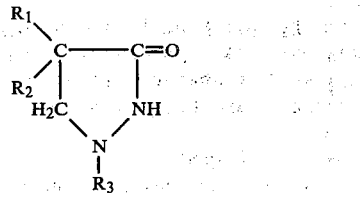

wherein $R_1$ and $R_2$ are hydroxyalkyl or alkyl group of 1–4 carbon atoms, at least one of $R_1$ and $R_2$ being hydroxyalkyl group and $R_3$ is an aryl group.

24. A silver complex diffusion transfer process according to claim 23, wherein said light sensitive material in contact with an image receiving material is silver complex diffusion transfer developed and thereafter both the materials are separated from each other to form a silver image on the image receiving material.

25. A silver complex diffusion transfer process according to claim 23, wherein the layer which is permeable to water through or out from the silver halide emulsion layer is a carbon black-containing layer.

26. A silver complex diffusion transfer process according to claim 25, wherein the alkaline solution contains at least (a) alkali agents, (b) preservatives and (c) silver halide solvents.

27. A silver complex diffusion transfer process according to claim 25, wherein amount of dihydroxybenzene is 0.3–3 g/m², that of 3-pyrazolidone is at least 0.1 g/m² and that of 4-unsubstituted-3-pyrazolidone is at most ⅓ of the weight of 3-pyrazolidone having the general formula.

28. A silver complex diffusion transfer process according to claim 25, wherein dihydroxybenzene and 3-pyrazolinone are contained in at least carbon black-containing layer.

29. A silver complex diffusion transfer process according to claim 28, wherein pH of the carbon black-containing layer is not more than 4.5.

* * * * *